United States Patent [19]

Knoedler et al.

[11] Patent Number: 4,508,797
[45] Date of Patent: Apr. 2, 1985

[54] HERMETICALLY SEALED ELECTRICAL FEEDTHROUGH FOR HIGH TEMPERATURE SECONDARY CELLS

[75] Inventors: Reinhard Knoedler, Nussloch, Fed. Rep. of Germany; Paul A. Nelson, Wheaton, Ill.; Hiroshi Shimotake, Hinsdale, Ill.; James E. Battles, Oak Forest, Ill.

[73] Assignee: The United States of America as represented by the United States Department of Energy, Washington, D.C.

[21] Appl. No.: 517,473

[22] Filed: Jul. 26, 1983

[51] Int. Cl.³ .................. H01M 2/08; H01M 2/02
[52] U.S. Cl. .................. 429/184; 429/181
[58] Field of Search .................. 429/181, 184

[56] References Cited

U.S. PATENT DOCUMENTS

| | | | |
|---|---|---|---|
| 1,323,307 | 12/1919 | Noble et al. | 429/181 X |
| 3,228,804 | 1/1966 | Weidner | 429/181 X |
| 4,071,663 | 1/1978 | Bredbonner | 429/181 |
| 4,224,388 | 9/1980 | Stadnick | 429/181 |
| 4,241,152 | 12/1980 | Klink | 429/181 |
| 4,326,016 | 4/1982 | Selover et al. | 429/184 |
| 4,430,396 | 2/1984 | Hayes | 429/184 |

Primary Examiner—Brian E. Hearn
Assistant Examiner—Stephen J. Kalafut
Attorney, Agent, or Firm—Charles F. Lind; Hugh W. Glenn; Judson R. Hightower

[57] ABSTRACT

A passthrough seal is disclosed for electrically isolating the terminal in a lithium/metal sulfide cell from the structural cell housing. The seal has spaced upper and lower insulator rings fitted snuggly between the terminal and an annularly disposed upstanding wall, and outwardly of a powdered insulator also confined between the upstanding wall and terminal. The adjacent surfaces of the upper insulator ring and the respective upstanding wall and terminal are conically tapered, diverging in the axial direction away from the cell interior, and a sealing ring is located between each pair of the adjacent surfaces. The components are sized so that upon appropriate movement of the upper insulator ring toward the lower insulator ring the powdered insulator and sealing rings are each compressed to a high degree. This compacts the powdered insulator thereby rendering the same highly impervious and moreover fuses the sealing rings to and between the adjacent surfaces. The upper and lower insulator rings might be formed of beryllium oxide and/or alumina, the powdered insulator might be formed of boron nitride, and the sealing rings might be formed of aluminum.

19 Claims, 2 Drawing Figures

HERMETICALLY SEALED ELECTRICAL FEEDTHROUGH FOR HIGH TEMPERATURE SECONDARY CELLS

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

In the battery art, particularly research batteries of the sodium/sulfur or lithium/metal sulfide types, the materials used must be of high purity. The battery typically is "sealed" against the atmosphere to prevent atmospheric contamination and loss of active materials. Normally, the battery construction provides for many cells, each having positive and negative electrode assemblies and a common electrolyte, sealed in a housing, and external cell terminals from the housing. A battery case encloses all of the cell housings, and main positive and negative battery terminals are externally exposed relative to the case to allow for appropriate connections to be made with the apparatus powered by the battery. Each cell generates only a volt or two of electrical potential across the cell terminals, so that electrical connections are made externally of the cell housings, but internally of the battery case, in series and/or parallel, between the positive and negative cell terminals and the main positive and negative battery terminals for accumulating a battery voltage of possibly 100 volts or higher.

In most cell constructions, at least the positive or negative terminal of each cell must be passed through an opening in the cell housing, and an insulating and sealing structure (or "feedthrough" seal) is required at the terminal to maintain the cell interior sealed from or isolated from outside the housing, and to electrically isolate the cell housing from the terminal which are at different electrical potentials.

Specifically, the feedthrough seal electrically isolates the cell terminal extended through the cell housing wall from the wall and further is needed because (1) the liquid electrolyte is free to migrate within the cell and/or is exposed to the cell terminal at the underside of the feedthrough seal; (2) the active materials of the positive and negative electrodes must be sealed within the cell housing to minimize contamination to or from the surroundings or the feedthrough seal itself; and (3) the elevated operating temperatures (of the order of 400°-500° C.) can create gases to pressurize the sealed cell chamber. The feedthrough seal thus must be sound and resistant against the temperatures and corrosive nature of the battery materials, and further must preclude the movement of gases past the seal to ensure long term operation of the battery.

A typical lithium/iron sulfide cell or battery has a durable sealed housing; a positive electrode assembly of an iron sulfide (FeS) or iron disulfide ($FeS_2$); a negative electrode assembly of a lithium aluminum (LiAl) or lithium silicon (LiSi) alloy, with possible secondary additives of iron (Fe) or magnesium oxide (MgO); and a molten electrolyte of lithium chloride and potassium chloride (LiCl-KCl). A porous fiber-like separator of boron nitride (BN) or a powder separator of magnesium oxide (MgO) is typically interposed between the positive and negative electrode assemblies for electrically isolating one from the other. The separator also acts as a reservoir for the electrolyte which provides for the lithium ion transport.

A common feedthrough seal for the positive and/or negative cell terminal of each cell has a lower insulator sleeve, generally formed of beryllium oxide (BeO) fitted over the cell terminal, generally formed of iron (Fe) or nickel (Ni) for the FeS cell, and molybdenum (Mo) for the $FeS_2$ cell, and into an opening in the housing wall, so that the terminal is electrically isolated from the housing wall. Boron nitride (BN) powder is then tightly packed into an annular cavity formed between the cell terminal and an upstanding housing wall surrounding the terminal. An insulator ring, generally formed of beryllium oxide (BeO) or alumina ($Al_2O_3$), is then positioned over the conductive terminal and against the upper side of the boron nitride powder; and the upstanding housing wall is typically then mechanically crimped tightly over the ring. As the boron nitride powder is not wetted by the electrolyte, the seal does prevent electrolyte leakage and does perform quite well considering its need for providing electrical insulation and resistance against corrosion.

One major drawback with this seal construction is the lack of any hard connection between the terminal and the housing, which can raise mechanical durability problems. Still further, boron nitride has to be of a very high purity (equivalent almost to a laboratory grade obtained such as by firing at 1700°-2100° C. in a nitrogen atmosphere for 10 minutes-2 hours), otherwise the cell tends to short out across the boron nitride. Lastly, although both the beryllium oxide and the boron nitride are highly resistant to corrosion, there typically is not sufficient compression of the powdered boron nitride to provide for a completely impervious seal, such as having a leak rate of helium of less than $10^{-7}$ to $10^{-9}$ $cm^3/sec/cm^2$. One limiting factor to high compression of the powdered boron nitride is the fact that the beryllium oxide insulator is very brittle and will crack upon excess pressure being directed thereagainst.

SUMMARY OF THE INVENTION

This invention teaches an improved feedthrough seal for the electrical terminal of a lithium/iron sulfide (or iron disulfide) cell or battery.

A basic object of this invention is to provide an improved terminal feedthrough seal that is effective to hermetically seal between the cell terminal and the cell housing, to the extent of containing generated reaction gases, etc., to a leak rate of helium of $10^{-7}$ to $10^{-9}$ $cm^3/sec/cm^2$ or less.

Another object of this invention is to provide a terminal feedthrough seal that is effective to withstand the corrosive contamination of the reaction gases generated or chemicals used in the cell, even at operating temperatures of the cell of up to 400°-500° C.

Another object of this invention is to provide a terminal feedthrough seal that is effective to mechanically trap and contain the cell terminal relative to the cell housing.

DETAILED DESCRIPTION OF THE PREFERRED EMBODIMENT

Figure 1:
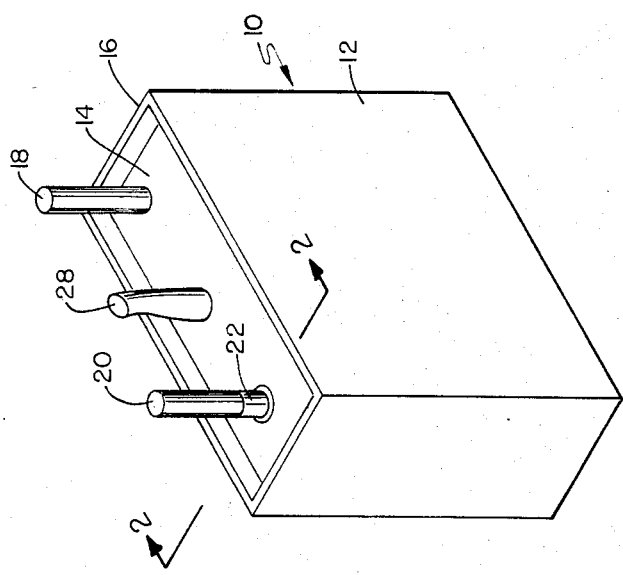
FIG. 1 is a perspective view of a typical cell housing, showing specifically the exposed positive and negative terminals of the cell, and the terminal feedthrough seal forming the subject invention operatively cooperating with one of the terminals.

As illustrated somewhat schematically in FIG. 1, a typical battery cell 10 would have an exterior housing 12 fabricated of impervious durable material, such as carbon or stainless steel, nickel alloy or the like, capable of withstanding the chemical corrosion and operating temperatures of the cell. The housing 12 would have opposing pairs of side walls and opposing top and bottom walls, integrally formed or otherwise connected together at adjacent corners so as to define a sealed interior chamber 13 (see FIG. 2). Separate positive and negative electrode assemblies (not shown) of conventional construction would be located in the housing, physically and electrically separated from one another.

In the embodiment illustrated, the top wall 14 might be a separate piece welded to the open top of the housing at the top corner edges 16 after the electrode assemblies had been positioned into the housing from the open top thereof. Also, the negative electrode assembly might be secured to or be in contact with the housing 12, to result in a negative grounded cell. The exposed negative terminal 18 of the cell can be integral with or mechanically connected (such as by welding) directly to the housing top wall 14, as the terminal 18 does not need or use a passthrough seal.

The positive terminal 20 of the cell, however, must be extended through a passthrough seal 22 in the top wall 14 of the housing, as the terminal must be electrically insulated from the cell housing 12. The terminal 20 thus has within the sealed cell chamber 13 (see FIG. 2) an interior end 24 to which the positive electrode assemblies will be electrically connected and has an exposed exterior end 26 to which a suitable electrical connection could be made. A fill tube 28 is also provided in the top wall 14 for the electrolyte, the same being hermetically closed such as by welding a cap in place after the electrolyte has been infused into the cell chamber.

Most commonly, many cells are used in a single battery (not shown), stacked side by side within a single battery case. The positive and negative cell terminals would be connected together in parallel and/or series circuits externally of the cell housings but internally of the battery case to give a higher cumulative voltage output of possibly up to 100 volts at the exposed positive and negative battery terminals. The operating temperatures of the cells 14 might be of the order of 400°–500° C. so that thermal insulation would be used over the outside of the battery case in order to minimize loss of heat from the cells as well as further to allow a person to safely touch the exposed exterior surface of the battery. Various vacuum type insulation structures have been employed in combination with and over the battery case, and special conductor means are also available for electrically passing the cumulated cell voltages through the insulation structures with little thermal heat transfer; but neither form any part of this invention and thus are not illustrated.

Figure 2:
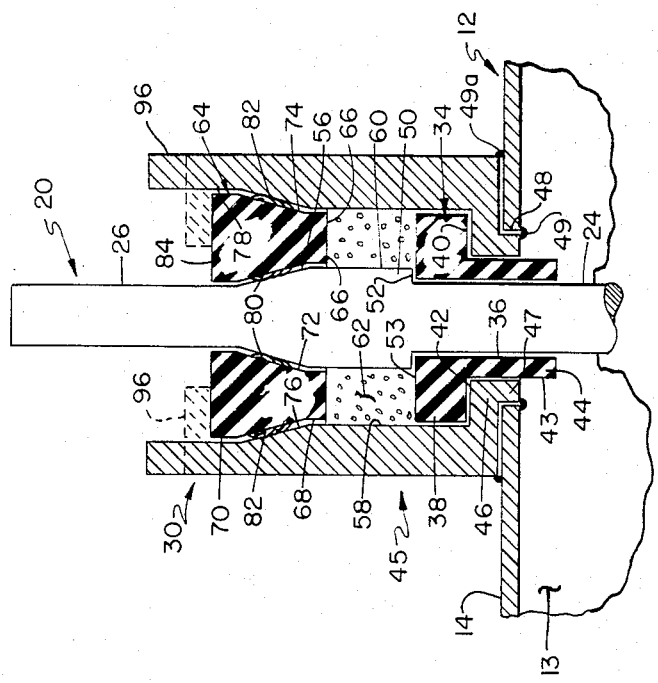
FIG. 2 is a sectional view, as seen generally from line 2—2 in FIG. 1, of the terminal feedthrough seal forming the subject matter of this invention.

The preferred embodiment of the improved passthrough seal 22 is illustrated in FIG. 2. An annular wall 30 upstands from the housing wall 14 radially spaced from the terminal 20 leaving an annular space between the wall and the terminal. A lower ceramic insulator 34 is formed as an annulus having a bore 36 adapted to receive the lower interior end 24 of the cell terminal 20, with only moderate clearance (0.005", for example) although a larger gap is illustrated between the parts for clarity of disclosure. The insulator 34 further has an enlarged head section 38 including a downwardly facing shoulder 40 adapted to butt effectively against the top side 42 of the housing wall 12, and a smaller stem section 43 adapted to fit within a circular opening 44 effectively in the housing wall.

As illustrated, the upstanding wall 30 actually is formed from a tubular element 45 having a stepped lower end including a lateral step 46 and an axial stem 47. The step 46 abuts the top wall 14 and the stem 47 fits within the opening 48 in the housing top wall 14. Preferably the tubular element 45 is welded to the wall 14, as a bead 49 (or alternately at bead-not-shown-at corner 49a) to define a unitary structure with the wall.

The terminal 20 also has an enlarged section 50, having lower shoulder 52 adapted to rest on the upper surface 53 of insulator 34, and a conically tapered surface 56 converging upwardly away from lower shoulder 52. The housing wall 30, and the terminal 20 at the enlarged section 50, respectively, have generally cylindrical mutually facing surfaces 58 and 60 that are arranged concentrically of the terminal 20.

A mass 62 of powdered insulating material is located in place over the surface 53 of lower insulator 34 and between surfaces 58 and 60 of the upstanding housing wall 30 and terminal 20. An upper insulator 64, formed as a ring, is fitted over the upper end 26 of terminal 20 and has a lower end surface 66 snugged against the mass 62. The upper insulator 64 has a short cylindrical bottom portion 68 and a concentrically arranged wider cylindrical upper portion 70, and interconnecting tapered inside and outside surfaces 72 and 74 extended therebetween. Further, the upstanding housing wall 30 has a conically tapered surface 76 diverging in a direction away from the shoulder 42. Preferably, the two pairs of adjacent tapered surfaces (56 and 72, and 74 and 76) are generally parallel or complementary to one another and are concentrically disposed respectively relative to the terminal 20. Also, these surfaces are angled between 5° and 30° relative to the longitudinal axis of the terminal. The upstanding wall 30 further has a cylindrical surface 78 that opposes the cylindrical surface 70 of the upper separator 64. The lower cylindrical portion 68 of the upper insulator is sized to fit snuggly (with perhaps 0.005" gaps adjacent each surface) between the surfaces 58 and 60 of the wall 30 and terminal 20, respectively, while the upper cylindrical portion 70 is sized to fit with about the same clearance between the surfaces 78 and 26 of the wall 30 and terminal 20.

A pair of relatively ductile sealing rings 80 and 82, formed possibly of aluminum (Al), are adapted to fit respectively between the adjacent tapered surfaces 56 and 72, and 74 and 76; the rings being large enough and the other components being sized so as to maintain these surfaces normally spaced apart from one another. The upper insulator 64 further has a flat upper surface 84 parallel to lower end surface 66.

The insulator 34 is made of a ceramic material such as beryllium oxide (BeO), while insulator 64 is made of a ceramic material such as alumina ($Al_2O_3$) or possibly also of BeO. Each of these materials is an electric insulator having a very high melting temperature and good resistance against chemical corrosion. The mass 62 of insulating material can be finely powdered boron nitrite (screened through −40 to +325 mesh to be of approximately 420 to 45 micron size).

To set the seal, the upper insulator ring 64 is butted against the boron nitride powder mass 62 and against the two aluminum rings 80 and 82, respectively, sandwiched between the tapered surfaces of the upper insulator ring and the upstanding housing wall and terminal. The upper insulator 64 is then moved axially toward the lower insulator 34 with sufficient force and displacement to: (1) pack the boron nitride powder to the order of 15–25,000 psi pressure and simultaneously (2) bond with pressures of the order of 15–20,000 psi the aluminum rings to the adjacent surfaces. This packing and bonding step is done at an elevated temperature (of the order of between 450°–600° C.) and in an inert atmosphere such as of argon.

The bonds established between the aluminum rings and the respective tapered surfaces is hermetically sound, and the packing of the boron nitride is to a density of the order of 80–95% of theoretical. These provide a barrier that is highly effective against both electrolyte and vapor leakage from the cell and that has high resistance against chemical corrosion. The seal in fact is hermetical, and further allows operation of the cell at temperatures in the 400°–500° C. range.

The upstanding wall 30 might further have end projection 96 just beyond the upper separator surface 84 that could be crimped or otherwise suitably folded inwardly over the upper insulator 64 to provide additional mechanical securement holding the components in place. The projections 96 should preferably lap at most no more than possibly half way across the upper insulator toward the terminal.

Thus, the terminal 20 is trapped against movement in a downward direction by its shoulder 52 butting against the upper surface 53 of the lower insulator 34, where the insulator 34 in turn is restricted against downward movement by having its lower surface 40 butting against the upper surface 42 on the housing wall (the step section 46 of the tubular piece 45). Further, the terminal 20 is trapped against movement in an upward direction (removal from the cell) by the binding interference between the opposed tapered surfaces 56 and 72 of the terminal and upper insulator 64. The high compression packing of the mass 62 of boron nitrite, and the bonds established between the aluminum rings 80 and 82 and the complementary tapered surfaces 56 and 72, and 74 and 76 of the upstanding wall 30, the terminal 20, and the upper insulator 64 provide a good degree of mechanical stability to the seal. Crimping the upstanding housing wall end projection 96 over the upper insulator ring 64, as noted above, even further mechanically secures the terminal 20. Moreover, the bonded aluminum rings 80 and 82 hermetically seal the cell chamber in the area of the feedthrough seal. The boron nitride powder compressed to the degree noted (of the order of 15–25,000 psi) minimizes vapor leakage to or against the bonded aluminum seals; thereby adding durability and life to such a feedthrough seal.

The embodiments of the invention in which an exclusive property or privilege is claimed are defined as follows:

1. In a lithium/metal sulfide cell, a passthrough seal for electrically isolating a cell terminal from the cell housing and for sealingly insolating the cell chamber from the exterior thereof, comprising an upstanding wall sealed to the housing and located generally annularly of and spaced from the terminal as it is extended through an opening in the housing, a lower insulator ring fitted snuggly over the terminal and within the upstanding wall, cooperating shoulder means on the lower ring and on the housing and terminal respectively operable to preclude axial movement of the terminal inwardly relative to the housing, a powdered insulator disposed over the lower ring and between the upstanding wall and the terminal, an upper insulator ring fitted snugly between the upstanding wall and the terminal and against the powdered insulator opposite the lower ring, the upper ring and the upstanding wall and terminal having pairs of opposed surfaces that move closer together as the ring is moved axially inwardly toward the powdered insulator, and rings of soft bonding material located annularly of the terminal and confined between the opposed pairs of surfaces, said seal being set upon axial movement of the upper ring toward the powdered insulator firstly to compress that powdered insulator to a high order of compression and secondly to compress the rings of soft bonding material sufficiently to bond them between the adjacent surfaces.

2. The passthrough seal combination according to claim 1, further providing an upper end projection on the upstanding wall that is crimped over the top surface of the upper ring.

3. The passthrough seal combination according to claim 1, wherein said powdered insulator is in the form boron nitride originally being of a −40 to +325 mesh size.

4. The passthrough seal combination according to claim 1, wherein the lower ring is formed of a ceramic of the order of beryilium oxide (BeO).

5. The passthrough seal combination according to claim 1, wherein the upper ring is formed of a ceramic of the order of alumina ($Al_2O_3$).

6. The passthrough seal combination according to claim 1, wherein the soft bonding material of the rings is of the order of aluminum (Al).

7. The passthrough seal combination according to claim 1, wherein the powdered insulator is compressed to the order of 15,000–25,000 psi.

8. The passthrough seal combination according to claim 1, wherein the rings of soft bonding material are compressed to the order of 15,000–25,000 psi.

9. The passthrough seal combination according to claim 1, wherein the pairs of opposed surfaces are tapered.

10. The passthrough seal combination according to claim 9, wherein the taper of the tapered surface on the upstanding wall diverges in the direction away from the housing toward the exterior thereof.

11. The passthrough seal combination according to claim 9, wherein the taper of the tapered surface on the terminal converges in the direction away from the housing toward the exterior thereof.

12. The passthrough seal combination according to claim 10, wherein the taper of the tapered surface on the terminal converges in the direction away from the housing toward the exterior thereof, and wherein the tapers of the tapered surfaces on the upper ring are complementary respectively to the tapers of the tapered surfaces on the upstanding wall and terminal.

13. The passthrough seal combination according to claim 12, further providing cooperating shoulder means on the lower ring and on the housing and terminal respectively operable when the seal is set to preclude axial inward movement of the terminal.

14. The passthrough seal combination according to claim 13, further providing an upper end projection on the upstanding wall that is crimped over the top surface of the upper ring.

15. The passthrough seal combination according to claim 14, wherein said powdered insulator is in the form boron nitride originally being of a −40 to +325 mesh size.

16. The passthrough seal combination according to claim 14, wherein the lower ring is formed of a ceramic of the order of beryllium oxide (BeO).

17. The passthrough seal combination according to claim 14, wherein the upper ring is formed of a ceramic of the order of alumina ($Al_2O_3$).

18. The passthrough seal combination according to claim 14, wherein the soft bonding material of the rings is of the order of aluminum (Al).

19. The passthrough seal combination according to claim 14, wherein the powdered insulator and the rings of soft bonding material each is compressed to the order of 15,000–25,000 psi.

* * * * *